2,451,136

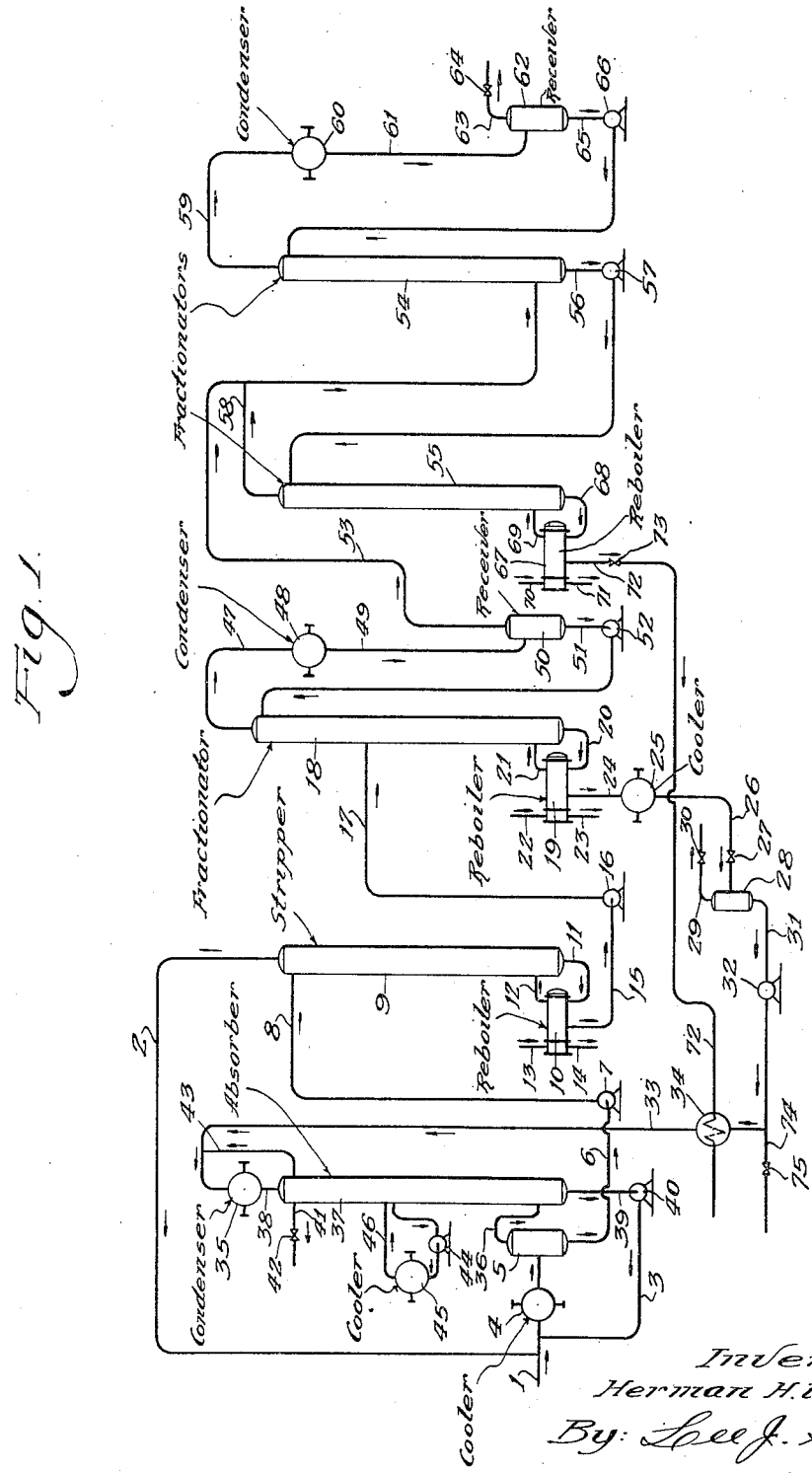
Oct. 12, 1948.  H. H. WENZKE  2,451,136
TREATMENT OF NORMALLY GASEOUS MIXTURES
Filed May 29, 1944  2 Sheets-Sheet 1
Inventor:
Herman H. Wenzke
By: Lee J. Gary
Attorney Oct. 12, 1948.                    H. H. WENZKE                    2,451,136
                        TREATMENT OF NORMALLY GASEOUS MIXTURES
Filed May 29, 1944                                           2 Sheets—Sheet 2
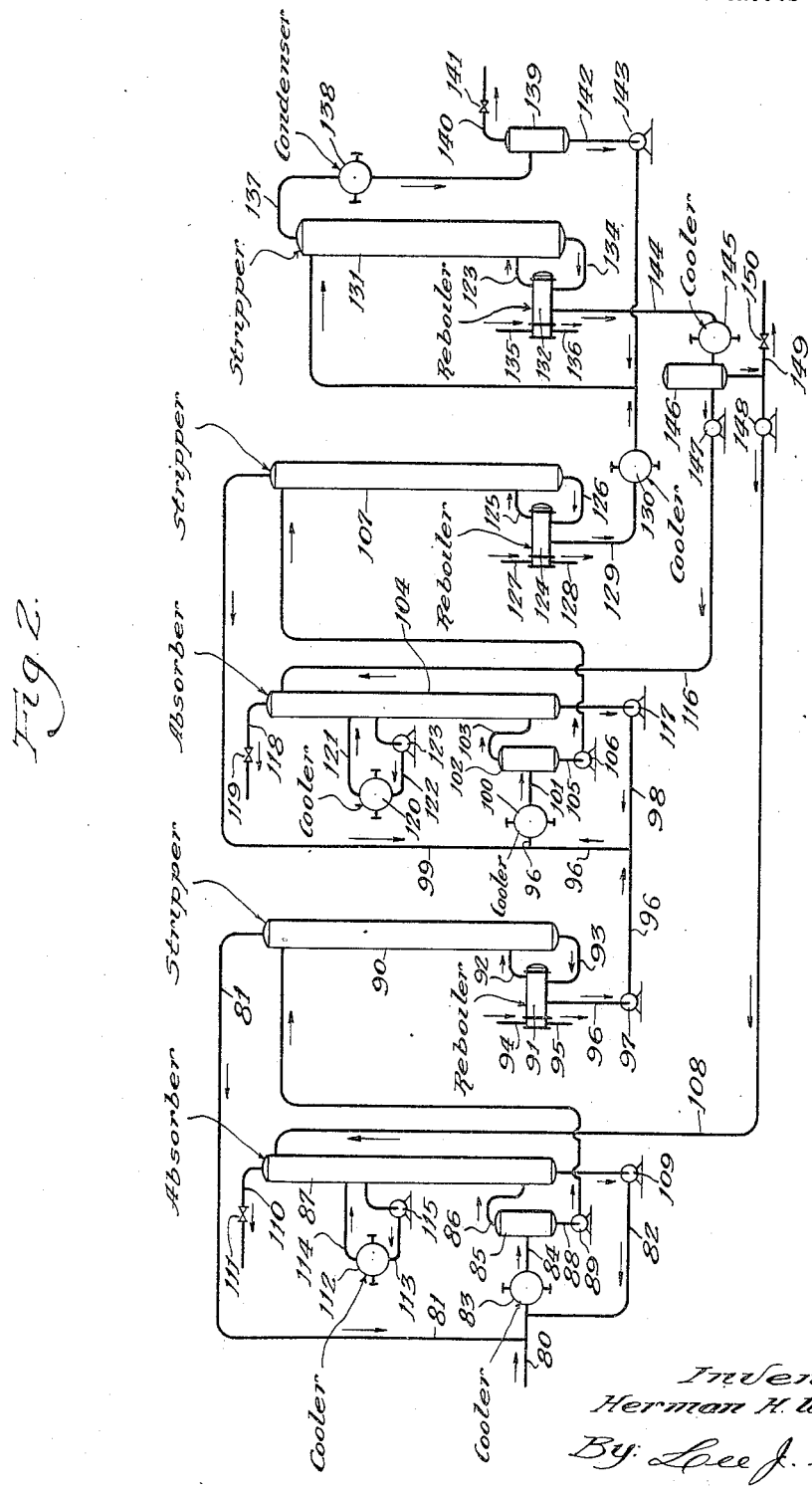
Inventor:
Herman H. Wenzke
By: Lee J. Gary
Attorney Patented Oct. 12, 1948

UNITED STATES PATENT OFFICE 2,451,136

TREATMENT OF NORMALLY GASEOUS MIXTURES

Herman H. Wenzke, Chicago, Ill., assignor to Universal Oil Products Company, Chicago, Ill., a corporation of Delaware Application May 29, 1944, Serial No. 537,934

5 Claims. (Cl. 183—115)

1

This invention relates to the treatment of normally gaseous mixtures and more particularly to a method of separating individual gaseous fractions from a mixture also containing lighter and heavier components.

More specifically this invention involves the use of separation, absorption, and fractionating steps connected to function in an interdependent and cooperative manner with a resultant more efficient separation of individual fractions from mixtures of normally gaseous components than is obtainable in equipment now in general use when operated in a conventional manner.

Broadly, the invention comprises a process for separating a desired gaseous fraction from a mixture also containing lighter and heavier components which comprises commingling said mixture with a liquid absorbent under superatmospheric pressure and at a temperature sufficiently low that said desired gaseous fraction and a small amount of lighter gases are retained in said liquid absorbent, separating the resultant rich absorbent from the undissolved gases, stripping the lighter gases from the rich absorbent, and combining the stripped lighter gases with said mixture and said liquid absorbent prior to said cooling, and fractionating said stripped rich absorbent to separate the desired gaseous fraction therefrom.

In a more specific embodiment the invention comprises a process for separating a gaseous hydrocarbon from a hydrocarbon mixture also containing lighter and heavier components which comprises commingling said hydrocarbon mixture with a liquid absorbent under superatmospheric pressure and at a temperature sufficiently low that said desired gaseous hydrocarbon and a small amount of lighter gases are retained in said liquid absorbent, separating the resultant rich absorbent from the undissolved gases, stripping the lighter gases from the rich absorbent and combining the stripped lighter gases with said hydrocarbon mixture and said liquid absorbent prior to said cooling, and fractionating said striped rich absorbent to separate the desired gaseous hydrocarbon therefrom.

At the present time normaly gaseous materials, particularly normally gaseous hydrocarbons are employed as starting materials for the synthesis of many organic compounds. For example, ethylene is in great demand for many processes, it being employed as the starting material for the production of alcohol useful in the manufacture of explosives and as a starting material for the manufacture of butadiene. Ethylene as well as various other gaseous olefins including propylene and butylenes are useful as starting materials for various alkylation and polymerization processes for the manufactuer of motor fuels of exceptionally high antiknock quality.

Heretofore, processes for the separation of individual hydrocarbons from the gaseous products of hydrocarbon cracking and conversion processes, such as thermal cracking and reforming or catalytic cracking and reforming processes, have not been of commercial practicability. The present invention offers an efficient process for the separation of individual hydrocarbons or narrow boiling range fractions of gaseous hydrocarbons from normally gaseous hydrocarbon mixtures also containing lighter and heavier components than the fraction which is desired.

In order to further illustrate the features and advantages of the present invention, reference is made to the accompanying diagrammatic drawing and the following description thereof:

Figure 1 illustrates one specific form of apparatus in which the process of the invention may be successfully conducted.

Figure 2 illustrates another form of apparatus in which the process of the invention may be successfully conducted.

In connection with the explanation of the operation of equipment shown in Figure 1, the description will be limited to obtaining ethylene as the desired hydrocarbon from a gaseous hydrocarbon fraction. It is to be understood, however, that any other desired hydrocarbons or narrow boiling range hydrocarbon fractions may be separated from hydrocarbon mixtures containing lighter and heavier materials by adjusting the operating conditions of the apparatus.

Referring to Figure 1, a normally gaseous hydrocarbon mixture comprising substantially hydrocarbons boiling below butane is introduced through line 1 at a suitable pressure depending upon the operating temperature of the separating equipment. Lean gases produced as hereinafter described are conducted through line 2 and commingled with the normally gaseous hydrocarbons in line 1 along with a liquid absorbent conduced through line 3 and produced as hereinafter described. The resultant mixture is then cooled in cooler 4 to a temperature below the critical temperature of ethene which is about 49° F. at a pressure sufficient to liquefy ethane. For instance, this temperature when operating at 500 lbs. per square inch would normally be about 20° F. On the other hand, when operating at about 250 lbs. per square inch, this temperature would necessarily be about —20° F. The cooled mixture in line 1 is then directed into separation zone 5 wherein the liquid absorbent and hydrocarbons dissolved therein are separated from the unabsorbed gases. The rich liquid absorbent containing dissolved hydrocarbons is withdrawn from separation zone 5 by means of line 6 and pump 7 wherefrom it is conducted by line 8 to stripper 9. In stripper 9, substantially all of the hydrocarbons boiling below ethylene are removed from the rich liquid absorbent and returned through line 2 to line 1 as the aforesaid lean gases. Heat for stripping may be supplied to stripper 9 by any conventional means such as reboiler 10.

It is, of course, within the scope of the invention to supply heat to stripper 9 in any well-known manner not illustrated such as, for example, by passing the liquid therein through a heating coil, circulating a suitable heating medium to the lower portion of the vessel or by directly commingling the liquid absorbent with a suitable heating medium such as steam or a reheated portion of said liquid absorbent.

Reboiler 10 is connected to stripper 9 by means of lines 11 and 12 and a suitable heating medium may be supplied to and withdrawn from reboiler 10 by means of lines 13 and 14 respectively. The stripped rich liquid absorbent substantially free from dissolved hydrocarbons boiling lower than ethylene is withdrawn from reboiler 10 by means of line 15 and pump 16 wherefrom it is directed through line 17 to fractionator 18. The function of fractionator 18 is to separate ethane and ethylene from the liquid absorbent, heat, therefore, being supplied to the column by means of reboiler 19 which is connected to the column by means of lines 20 and 21. Reboiler 19 is heated by means of a suitable heating medium supplied thereto and withdrawn therefrom by means of lines 22 and 23 respectively. The lean liquid absorbent containing substantially no ethane or lower-boiling hydrocarbons is withdrawn from reboiler 19 through line 24 to be cooled in cooler 25 wherefrom it is directed through line 26 containing valve 27 to a flash separation vessel 28. The pressure of the cooled liquid medium passing through valve 27 is reduced and the heat contained therein is sufficient to vaporize some of the lighter hydrocarbon components which are removed from vessel 28 by line 29 controlled by valve 30 to be supplied to the plant fuel gas system or used for any other purpose to which they may be suited. Unvaporized liquid is removed from vessel 28 by means of line 31 and pump 32 from which the liquid absorbent is directed through line 33 containing heat exchanger 34 to condenser 35.

The above-mentioned unabsorbed gases in separation vessel 5 are removed therefrom through line 36 and directed into absorber 37. The lean liquid absorbent, after being cooled in condenser 35, is conducted to the upper portion of absorber 37 by means of line 38. This liquid absorbent will dissolve a substantial portion of the gases which have been introduced to absorber 37. The liquid absorbent containing dissolved gases will be withdrawn from absorber 37 by means of line 39 and pump 40 wherefrom it will be directed through line 3 to be commingled with the hydrocarbon mixture in line 1 as the aforesaid liquid absorbent. Hydrocarbon gases and hydrogen undissolved in absorber 37 are removed from the system through line 41 controlled by valve 42. Some vaporous hydrocarbons are withdrawn from the upper portion of absorber 37 by means of line 43 to be commingled with the lean liquid absorbent in line 33 thereby providing an added reflux for the column. Heat may be removed from an intermediate point in absorber 37 by means of pump 44 and cooler 45, which are interposed in recycle line 46.

The ethylene-ethane mixture removed as an overhead product from fractionator 18 is directed through line 47 to condenser 48 wherefrom the cooled mixture is directed by means of line 49 to receiver 50. In receiver 50, the condensed distillate is separated from the gaseous material and returned by means of line 51 containing pump 52 to the upper portion of fractionator 18 to act as reflux therefor. The gaseous material is withdrawn from receiver 50 by means of line 53 and directed into the lower portion of fractionator 54. Fractionator 54 is one section of a high efficiency fractionation system comprising fractionator 54 and fractionator 55. The liquid product from fractionator 54 being directed through line 56 containing pump 57 to the upper portion of fractionator 55 and the vaporous product from fractionator 55 being withdrawn by means of line 58 to commingle in line 53 with the charging material to fractionator 54.

The overhead product from fractionator 54 is removed therefrom by means of line 59 and cooled in condenser 60. The resultant cooled products are then directed by means of line 61 to receiver 62, wherefrom the uncondensed gases comprising a substantial portion of ethylene are removed through line 63 controlled by valve 64. The condensed distillate is removed from receiver 62 by means of line 65 containing pump 66 and supplied to the top of fractionator 54 to act as reflux therefor. The required heat of vaporization is supplied to fractionator 55 by means of reboiler 67 connected thereto by lines 68 and 69. Reboiler 67 is heated by any suitable heating medium supplied thereto and withdrawn therefrom by means of lines 70 and 71 respectively.

The liquid product from the bottom of fractionator 55 is removed from reboiler 67 through line 72 containing valve 73. Valve 73 is regulated to cause the expansion of the liquid product from fractionator 55, thereby causing a considerable reduction in its temperature. This relatively low temperature material is then directed to heat exchanger 34 wherein it is passed in indirect contact and heat exchanger relationship with the aforesaid liquid medium carried by line 33 thus cooling the same. After passing through heat exchanger 34, the material in line 72 may be directed to the fuel gas system for the plant or it may be put to any other suitable use.

Excess liquid absorbent may be removed from the system through line 74 controlled by valve 75.

Referring now to Figure 2, in this particular modification of the invention the process of the invention is applied to the fractionating step in which the desired component is separated from the liquid absorbent.

A gaseous hydrocarbon mixture is introduced to the system under pressure by means of line 80. In line 80 this material is contacted with lean gases passing through line 81 and with a liquid absorbent passing through line 82. The charge together with the lean gas and liquid absorbent pass into cooler 83 in which the conditions of temperature and pressure are so maintained as to cause the desired component in the charge and some of the lighter components to become substantially liquefied and dissolved in the liquid absorbent. The cooled material then passes through line 84 into separator 85. In separator 85 the rich liquid absorbent containing dissolved gases is separated from the undissolved gases, the latter passing through line 86 into absorber 87. The rich liquid absorbent is withdrawn from separator 85 through line 88 and pump 89 and directed into stripper 90. Stripper 90 is operated under conditions of temperature and pressure such that the dissolved gases lighter than the desired fraction are stripped from the rich liquid absorbent and passed through line 81 to be commingled with the charge in line 80.

In order to maintain the desired temperature in stripper 90, heat is supplied thereto by means of reboiler 91 which is interconnected with the column by means of lines 92 and 93. A suitable heating medium may be supplied and withdrawn from reboiler 91 by means of lines 94 and 95, respectively.

The rich liquid absorbent stripped of lighter gases but still retaining the desired fraction is withdrawn from reboiler 91 by means of line 96 and pump 97 and commingled with a second liquid absorbent passing through line 98 and a second lean gas passing through line 99. The liquid absorbent containing the desired fraction plus the second liquid absorbent and second lean gas pass into cooler 100 wherein the temperature and pressure are maintained such that the desired component is not substantially retained in the combined liquid absorbent. The cooled material is then passed by means of line 101 into separator 102. In separator 102 the desired fraction is separated from the combined liquid absorbent as a gas and passed through line 103 into absorber 104. The rich combined liquid absorbent is withdrawn from separator 102 by means of line 105 and pump 106 and directed into stripper 107. Stripper 107 is maintained at conditions of temperature and pressure such that any of the desired fraction remaining in the rich combined liquid absorbent is removed therefrom and passed overhead by means of line 99 as said second lean gas.

Any of the desired fraction passing into absorber 87 is absorbed from the lighter gases by means of liquid absorbent introduced through line 108. The thus enriched liquid absorbent is then withdrawn from the bottom of the absorber by means of line 82 and pump 109. The lean gases lighter than the desired fraction are removed from the system through line 110 controlled by valve 111. In this particular absorber an intercooler 112 is employed which is connected to the column by means of lines 113 and 114. Circulation through cooler 112 is maintained by means of pump 115.

In absorber 104 those components higher boiling than the desired fraction are absorbed in a liquid absorbent introduced through line 116. The thus enriched absorbent is then withdrawn by means of pump 117 and line 98 as said second liquid absorbent. The desired fraction is withdrawn from the system through line 118 controlled by valve 119. The desired temperature is maintained in absorber 104 by means of cooler 120, connecting lines 121 and 122, and circulating pump 123.

Stripper 107 is supplied with the necessary heat by means of reboiler 124 which is connected therewith by means of lines 125 and 126. Heat is supplied to the reboiler by means of a suitable heat convective fluid supplied to and withdrawn from the reboiler by lines 127 and 182, respectively. The combined liquid absorbent stripped of the desired fraction and lighter gases passes through line 129 and cooler 130 into stripper 131. Stripper 131 is supplied with the necessary heat by means of reboiler 132 connected therewith by means of line 133 and 134. Heat is supplied to reboiler 132 by a suitable convective heating fluid passing through lines 135 and 136. In stripper 131 the heavier components of the charge may be separated from the once stripped combined liquid absorbent. This stripped material passes overhead through line 137 into condenser 138. The resultant cooled material is then separated in receiver 139. The stripped gases are removed from the system by means of line 140 controlled by valve 141. Distillate from receiver 139 is passed by means of line 142 and pump 143 into line 129 to be commingled with the charge to the stripper. This distillate will in general comprise components of the liquid absorbent which passed overhead from the stripper and may contain small percentages of the heavier components of the charge to the plant. The lean liquid absorbent is withdrawn from reboiler 132 by means of line 144 and passes through cooler 145 into surge drum 146. From surge drum 146 the lean liquid absorbent is directed by means of pump 147 and line 116 into absorber 104. Another portion of the lean liquid absorbent is directed by means of pump 148 in line 108 into absorber 87. In cases where some of the heavier components of the charging stream are employed as the liquid absorbent there will be an accumulation of this material in the system unless means are supplied for removing it. These means may comprise line 149 controlled by valve 150.

The following examples are included to illustrate the utility of this invention:

*Example I*

In equipment such as that shown in Figure 1 a normally gaseous hydrocarbon feed having an analysis as shown in the following table is charged to the plant through line 1 at a pressure somewhat higher than 500 p. s. i.

| | Mol. per cent |
|---|---|
| Hydrogen | 5.2 |
| Methane | 27.0 |
| Ethylene | 10.4 |
| Ethane | 15.8 |
| Propylene+ | 41.6 |
| | 100.0 |

This material is commingled with a liquid absorbent returned through line 3 and lean gases returned through line 2 and the mixture cooled in cooler 4 to a temperature of about 20° F., the pressure being substantially 500 pounds per square inch. The liquid component from separator 5 is directed to stripper 9 which is operated with a top temperature of about 40° F. and at a pressure of about 510 pounds per square inch. Reboiler 10 provides heat sufficient to maintain the bottom temperature of stripper 9 at about 137° F. The liquid fraction from stripper 9 is then directed to fractionator 18 which is operated at about 510 pounds per square inch pressure with a top temperature of about 100° F. and a bottom temperature of about 170° F. The overhead product from fractionator 18 is then treated in the fractionation system consisting of fractionators 54 and 55 which operate at a pressure of about 500 pounds per square inch, the bottom temperature of fractionator 55 being maintained at about 103° F. and the top temperature of fractionator 54 being maintained at about 22° F. The bottoms from fractionator 18 is passed through cooler 25 and pressure reducing valve 27 wherein a portion thereof is flashed thus reducing the temperature from about 100° F. to about 58° F. The unflashed material is then directed by means of line 31, pump 32, and line 33 through heat exchanger 34, condenser 35 and line 36, into absorber 37. The bottoms from fractionator 55 are flashed by flowing through reducing valve 73 in line 72 and then passed in indirect heat exchange relation with the unflashed bottoms from fractionator 18 in heat exchanger 34. The bottoms from fractionator 55, after flashing, will have a temperature of about 0° F. This material in heat exchanger 34 will reduce the temperature of the unflashed bottoms from fractionator 18 to about 20° F.

The overhead product from fractionator 54 is cooled in condenser 60 and the uncondensed material removed from the system by means of line 63 controlled by valve 64. This material has an analysis as shown by the following table:

| | Mol per cent |
|---|---|
| Methane | 1.2 |
| Ethylene | 95.0 |
| Ethane | 3.8 |
| | 100.0 |

These data indicate that approximately 90% of the original ethylene charged to the system is recovered in a fraction which is comprised of about 95% pure ethylene.

*Example II*

This example employs the equipment of Figure 1 and a charge having an analysis as shown in the following table:

| | Mol per cent |
|---|---|
| Hydrogen | 5.2 |
| Methane | 19.5 |
| Ethylene | 2.8 |
| Ethane | 10.9 |
| Propylene | 8.7 |
| Propane | 13.7 |
| Butylenes | 6.4 |
| i-Butane | 9.9 |
| n-Butane | 4.3 |
| i-Pentane | 6.4 |
| n-Pentane | 1.1 |
| Pentenes | 2.1 |
| $C_6+$ | 9.9 |
| | 100.0 |

This material is commingled in line 1 with a liquid absorbent from line 3 and lean gases from line 2 and cooled in cooler 4 to a temperature of about 100° F. at a pressure of about 200 pounds per square inch. The rich liquid absorbent from separator 5 is directed to stripper 9 which is operated at a top temperature of about 145° F and a pressure of about 200 pounds per square inch. The bottom temperature of stripper 9 is maintained at a temperature of about 250° F. The liquid fraction from stripper 9 is then directed to fractionator 18 which is operated at about 140 pounds per square inch with a top temperature of about 140° F. and a bottom temperature of about 360° F. The overhead product from fractionator 18 is then treated in fractionators 54 and 55 which operate at a pressure of about 225 pounds per square inch, the bottom temperature of fractionator 55 being maintained at about 205° F. and the top temperature of fractionator 54 being maintained at a temperature of about 110° F.

The overhead product from fractionator 54 is cooled in condenser 60 and the uncondensed material removed from the system by means of line 63 controlled by valve 64. This material has an analysis as shown by the following table:

| | Mol per cent |
|---|---|
| Ethylene | 0.1 |
| Ethane | 4.8 |
| Propylene | 34.7 |
| Propane | 59.7 |
| Butylenes | 0.2 |
| i-Butane | 0.4 |
| n-Butane | 0.1 |
| | 100.0 |

These data indicate that a propane-propylene fraction of better than 94% purity is readily obtainable when employing the present invention.

In this example the material passing through line 72 has an analysis as shown in the following table:

| | Mol per cent |
|---|---|
| Propylene | 0.9 |
| Propane | 1.5 |
| Butylenes | 30.2 |
| i-Butane | 46.2 |
| n-Butane | 20.2 |
| i-Pentane | 0.7 |
| n-Pentane | 0.1 |
| Pentenes | 0.2 |
| | 100.0 |

These data indicate that a butane-butylene fraction of better than 96% purity is also obtainable in the same operation, when employing the present invention.

The above examples clearly demonstrate the very efficient means which the present invention provides for the separation of individual hydrocarbons and hydrocarbon fractions from hydrocarbon mixtures also containing lighter and heavier components. These examples, however, are not to be construed as a limitation on the process because it is readily applicable to the separation of gaseous materials other than hydrocarbons and is only to be limited to the extent of the limitations in the appended claims.

I claim as my invention:

1. A process for separating a desired gaseous fraction from a gas mixture also containing lighter and heavier components which comprises commingling said mixture with a liquid absorbent under superatmospheric pressure, cooling the resultant mixture of gases and liquid absorbent to a temperature sufficiently low that said desired gaseous fraction and a small amount of lighter gases are retained in said liquid absorbent, separating the resultant rich absorbent from the undissolved gases, comprising a small amount of said desired gaseous fraction, stripping the lighter gases from the rich absorbent by heating and fractionating the same, commingling the stripped lighter gases with said gas mixture and said liquid absorbent prior to said cooling, separating the desired gaseous fraction from the stripped rich absorbent, contacting the resultant lean absorbent with said undissolved gases in a countercurrent absorption zone to absorb the small amount of said desired gaseous fraction therefrom, and supplying the resultant solution as said liquid absorbent.

2. A process for separating a desired gaseous hydrocarbon fraction from a hydrocarbon mixture also containing lighter and heavier components which comprises commingling said hydrocarbon mixture with a liquid absorbent under superatmospheric pressure, cooling the resultant mixture of hydrocarbons and liquid absorbent to a temperature sufficiently low that said desired gaseous hydrocarbon fraction and a small amount of lighter gases are retained in said liquid absorbent, separating the resultant rich absorbent from the undissolved gases, comprising a small amount of said desired gaseous hydrocarbon fraction, stripping the lighter gases from the rich absorbent by heating and fractionating the same, commingling the stripped lighter gases with said hydrocarbon mixture and said liquid absorbent prior to said cooling, fractionating the stripped rich absorbent to separate the desired gaseous hydrocarbon fraction therefrom, contacting the resultant lean absorbent with said undissolved gases in a countercurrent absorption zone to absorb the small amount of said desired gaseous hydrocarbon fraction therefrom, and supplying the resultant solution as said liquid absorbent.

3. A process for separating a desired gaseous hydrocarbon from a hydrocarbon mixture also containing lighter and heavier components which comprises commingling said hydrocarbon mixture with a liquid absorbent under superatmospheric pressure, cooling the resultant mixture of hydrocarbons and liquid absorbent to a temperature sufficiently low that said desired gaseous hydrocarbon and a small amount of lighter gases are retained in said liquid absorbent, separating the resultant rich absorbent from the undissolved gases comprising a small amount of said desired gaseous hydrocarbon, stripping the lighter gases from the rich absorbent by heating and fractionating the same, commingling the stripped lighter gases with said hydrocarbon mixture and said liquid absorbent prior to said cooling, fractionating the stripped rich absorbent to separate the desired gaseous hydrocarbon therefrom, contacting the resultant lean absorbent with said undissolved gases in a countercurrent absorption zone to absorb the small amount of said desired gaseous hydrocarbon therefrom, and supplying the resultant solution as said liquid absorbent.

4. The process of claim 2 further characterized in that said desired gaseous hydrocarbon fraction comprises pricipally $C_3$ hydrocarbons.

5. The process of claim 2 further characterized in that said desired gaseous hydrocarbon fraction comprises principally $C_4$ hydrocarbons.

HERMAN H. WENZKE.

REFERENCES CITED

The following references are of record in the file of this patent:

UNITED STATES PATENTS

| Number | Name | Date |
|---|---|---|
| 1,299,455 | Garner | Apr. 8, 1919 |
| 1,405,154 | Paris | Jan. 31, 1922 |
| 1,437,102 | Garner | Nov. 28, 1922 |
| 1,452,322 | Stewart | Apr. 17, 1923 |
| 1,465,600 | Eldred | Aug. 21, 1923 |
| 1,942,131 | Baumann | Jan. 2, 1934 |
| 1,987,267 | Ragatz | Jan. 8, 1935 |
| 2,059,494 | Shiras | Nov. 3, 1936 |
| Re. 21,239 | Walker | Oct. 17, 1939 |
| 2,272,503 | Bays | Feb. 10, 1942 |